US 6,554,561 B2

(12) United States Patent
Jäger

(10) Patent No.: US 6,554,561 B2
(45) Date of Patent: Apr. 29, 2003

(54) AUTOMATED CELL FOR HANDLING PARTS RECEIVED IN PARTS CARRIERS

(75) Inventor: Helmut F. Jäger, Königsbach-Stein (DE)

(73) Assignee: Felsomat GmbH & Co. KG, Konigsbach-Stein (DE)

( * ) Notice: Subject to any disclaimer, the term of this patent is extended or adjusted under 35 U.S.C. 154(b) by 0 days.

(21) Appl. No.: 09/784,922

(22) Filed: Feb. 15, 2001

(65) Prior Publication Data

US 2001/0031197 A1 Oct. 18, 2001

(30) Foreign Application Priority Data

Feb. 16, 2000 (DE) .......................... 100 07 024
Jul. 31, 2000 (EP) ............................. 00116128

(51) Int. Cl.⁷ ............................................. B65H 60/00
(52) U.S. Cl. ................. 414/788.4; 414/788.7; 414/795.7; 414/795.8; 414/796.9
(58) Field of Search ............. 414/795.7–795.8, 414/796.9, 788.4, 788.7

(56) References Cited

U.S. PATENT DOCUMENTS

| 3,893,575 A | * | 7/1975 | Pearne et al. ............. 414/796.9 |
| 3,914,154 A | * | 10/1975 | Pfeiffer ..................... 414/788.4 |
| 4,541,762 A | * | 9/1985 | Tischler et al. ............ 414/796.9 |
| 4,588,341 A | * | 5/1986 | Motoda .................... 414/788.4 |
| 4,978,275 A | * | 12/1990 | Reid et al. ................ 414/796.9 |
| 5,498,122 A | * | 3/1996 | Miura et al. .............. 414/788.7 |
| 5,536,137 A | * | 7/1996 | Jager ....................... 414/788.7 |
| 5,882,174 A | * | 3/1999 | Woerner et al. ......... 414/795.8 |
| 6,340,282 B1 | * | 1/2002 | Bar et al. ................. 414/795.8 |

FOREIGN PATENT DOCUMENTS

| DE | 19805206 A1 | * | 8/1999 | ............. 414/795.8 |
| EP | 0865869 A1 | * | 9/1998 | ............. 414/788.7 |
| GB | 2087846 A | * | 6/1982 | ............. 414/788.4 |

* cited by examiner

Primary Examiner—Kathy Matecki
Assistant Examiner—Sang Kim
(74) Attorney, Agent, or Firm—Henneman & Saunders; Larry E. Henneman, Jr.

(57) ABSTRACT

An automated cell is provided for handling parts received in part carriers. The device comprises a working space closed to the outside, within which a first, second and third stack position are sequentially arranged. A transfer device is provided with a first linear axis extending in a horizontal direction and a second linear axis coupled thereto extending in vertical direction. A bulkhead wall is arranged between the first and the second stack position, which together with a driveable hood guarantees a closure free of contact when the door on the front side of the device is opened. Handling procedures within the working space can then be decoupled from loading and unloading operations at the first stack position. The automated cell is very space-saving and inexpensive and also allows a stack-specific logistics.

20 Claims, 4 Drawing Sheets

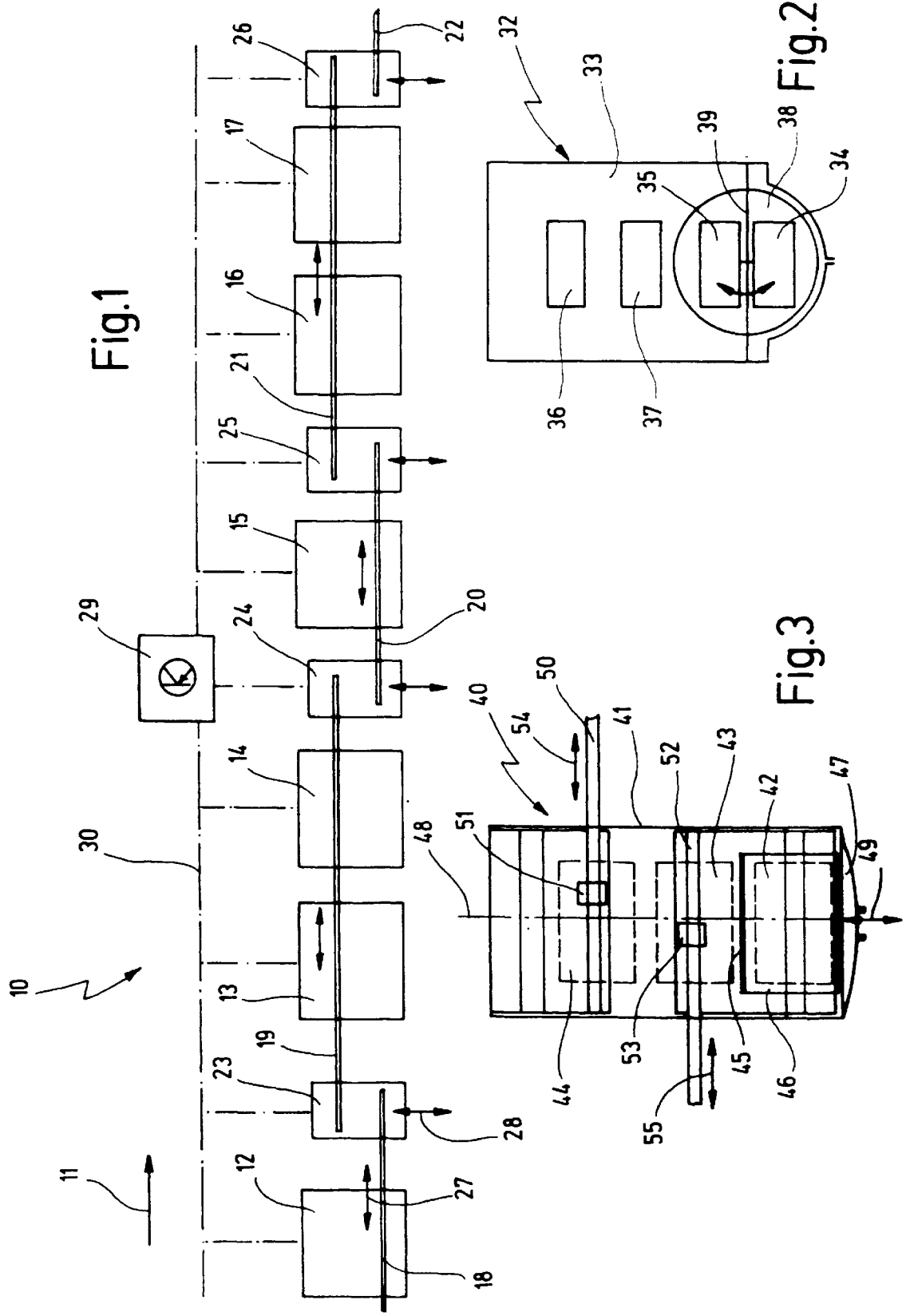

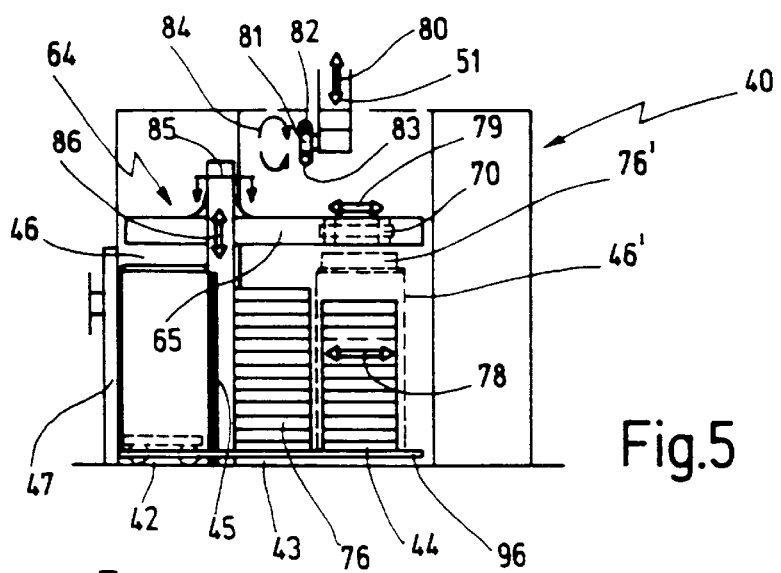
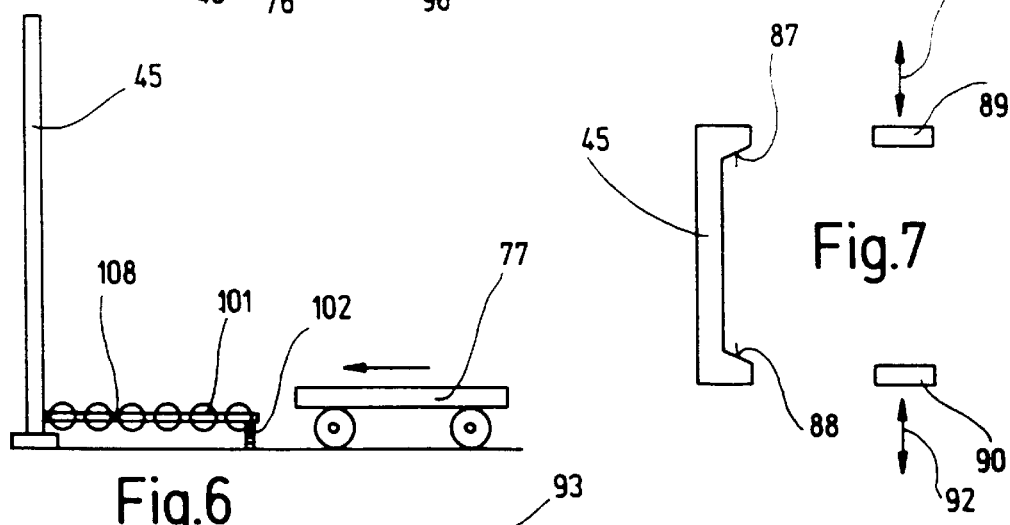
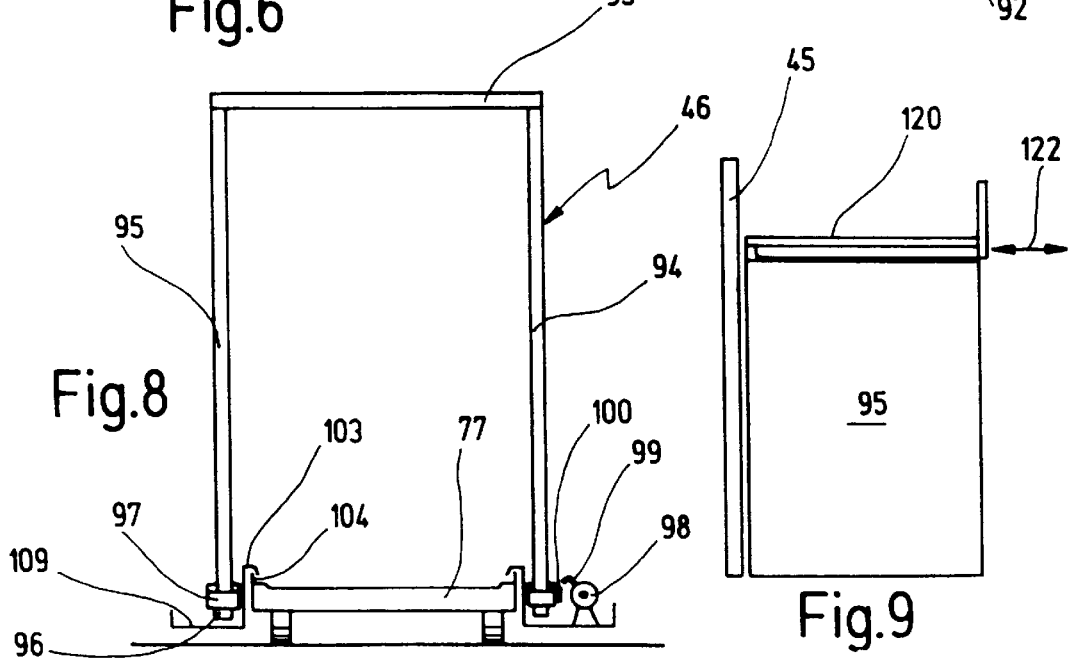

AUTOMATED CELL FOR HANDLING PARTS RECEIVED IN PARTS CARRIERS

FOREIGN PRIORITY

This application claims the right of foreign priority to Application No. 100 07 024.8 filed in Germany (B.R.D.) on Feb. 16, 2000, and to Application No. 00 116 128.0 filed in Germany (B.R.D.) on Jul. 31, 2000, and both applications are incorporated herein by reference in their entirety.

BACKGROUND OF THE INVENTION

The invention relates to an automated cell for handling parts received in part carriers comprising a working space closed to the outside in which first, second, and third stack positions are arranged in sequence. The first stack position can be separated from the others to be secured against contact. The automated cell includes a transfer device having a first linear axis extending in horizontal direction along the sequentially arranged stack positions as well as a second linear axis coupled thereto extending in vertical direction, where the transfer device allows movement of part carriers in the horizontal direction and in the vertical direction as well as a positioning of the part carriers for an associated transfer unit. The transfer unit allows the removal of parts from the part carriers and the transfer to an external station outside the working space as well as the introduction of parts into the working space and placement into the part carriers. The first stack position can be loaded through a door from the outside in the first horizontal direction.

Such an automated cell is disclosed in EP 0 865 869 A1. The known automated cell comprises a pallet transferring device within a working space closed to the outside, which can stack and unstack workpiece carriers between the two stack positions and additionally place them upwardly in a third intermediate position, so that individual parts can be removed with a portal gripper from a transversely running portal thereabove and other parts can be placed therein. A stack exchange module is also provided with a rotary table to supply stacks of part carriers into a front loading space, while individual part carriers can be handled within the working space closed off to the loading space. The rotary table is pivoted by 180° to introduce a stack of part carriers with fresh parts into the working space and to remove another stack of processed parts out of the space.

The construction of such automated cells is relatively complicated, because a stack exchange module must be provided apart from the pallet handling device. In addition, the space requirement of the automated cell is relatively large.

A further disadvantage arises when a so-called "stack specific logistics" is desired, i.e. when a mixing of parts from a stack of carriers with parts from another stack of carriers should be avoided. In such a case, relative long idle times and exchange times are necessary.

Another handling apparatus is known from DE 198 05 206 A1, where three stack positions are provided sequentially within a closed working space close, between which a stack of workpiece carriers can be transferred back and forth on their roller carts. The stacks of workpiece carriers are pushed into the corresponding stack positions from the sides and are removed therefrom. A handling unit accepts the workpiece carriers in a receiving position and after processing places them in a discharging position. Protective walls can be moved in between the individual stacks of workpiece carriers to improve working safety.

The required supply and removal of stacks of workpiece carriers into or out of the apparatus from the side has proven to be a disadvantage. This leads to an increased space requirement and, in addition, it is not apparent that complete work safety can be ensured by only inserting protective walls.

A further disadvantage is that the movement of the stacks of workpiece carriers within the apparatus takes place on roller carts. This leads to the functional reliability depending on the floor properties and alignment and, especially for relatively heavy stacks of workpiece carriers, to slippage of the entire stack or individual workpiece carriers, which can strongly impair the functional reliability and the accuracy in positioning during handling. Thus the known apparatus is hardly suitable as an automated cell for an automatic or at least partially automated production operation.

SUMMARY OF THE INVENTION

It is a first object of the present invention to provide an improved automated cell for handling parts received on part carriers.

It is a further object of the present invention to provide an improved automated cell having a cost-inexpensive construction with the lowest possible space requirement.

It is still a further object of the invention to provide an improved automated cell allowing a flexible operation in handling the parts within a working space closed to the outside to be secure against contact.

It is still another object of the invention to provide high precision in the handling operations to be achieved.

Another object of the invention is to provide for a method for handling parts in an automated cell, which allows a flexible control.

Also stack-specific logistics should be possible as well as a rapid throughput of parts.

These and other objects are achieved according to the present invention with an automated cell of the above-mentioned type in that the first stack position is separated from the second stack position by a bulk head extending substantially vertical. Thus any contact of an operator with parts handled inside the automated cell is avoided.

Preferably, a hood is provided to separate the first stack position against the remaining part of the working space. The hood may be displaced between the first and second stack positions or between the first, second and third stack positions.

The object of the present invention is also achieved with a method for handling parts in an automated cell in which first, second and third stack positions are arranged sequentially in horizontal direction within a closed working space and in which part carriers for receiving the parts are re-stacked among the three stack positions by a transfer device. The parts are removed from the part carriers by a transfer unit, transported to a associated station, preferably a processing station outside of the working space and parts are taken up from the associated station and placed into the part carriers.

Stacks of part carriers with fresh parts are supplied in horizontal direction to the first stack position and stacks of part carriers with processed parts at the first stack location are removed from the working space in the opposing direction. Part carriers are lifted above a bulkhead extending substantially vertically between the first stack position and the second adjacent stack position and are moved in horizontal direction.

According to the invention, an automated cell with three sequential stack positions is provided in which the transfer of part carriers in the closed working space between the individual stack positions as well as the preparation of the part carriers for an associated transfer unit can be achieved with a single transfer device. The transfer unit can be a portal gripper driveable along a portal running above the automated cell.

In this manner, the construction of the automated cell is distinctly simplified and can be realized with a very small space requirement. With a special strategy for transferring part carriers between the individual stack positions, a rapid operation and good adaptation to the associated processing stations is realized with very short cycle times. The first stack position in combination with the hood, which is driveable at least between the first and second stack position, is separated to be secured against contact with respect to the remaining portion of the working space through the arrangement of a bulkhead between the first and second stack position. In this manner, part carriers can be moved between the second and third stack position, while at the same time a stack of part carriers can be supplied at the first stack position or removed therefrom. Despite the extremely simple configuration of the automated cell, a decoupling of the handling within the working space is ensured in this manner from the loading and unloading of the automated cell when the door is opened. In addition, a greater precision in handling results because the part carriers are not shifted on the roller carts within the working space, but are moved by the transfer device.

With this concept, a particularly simple and inexpensive as well as space-saving construction results. Such an automated cell can also be advantageously employed in combination with an interlinked production system, by which a plurality of automated cells are arranged as buffers between the different processing stations, where the transport of parts between the individual stations and the cells takes place by grippers driveable on the portals.

In an advantageous embodiment of the present invention, the bulkhead is configured to be stationary. This results in a particularly simple and space-saving construction, where the part carriers are lifted over the bulkhead for transfer between the first and second stack positions. For the purposes of service, the bulkhead wall is relatively simple to remove to allow a simple access to the working space of the cell.

In an additional embodiment of the present invention, the bulkhead is provided with centering surfaces for guiding and centering the part carriers supplied to the first stack position. In addition, guide elements can be associated with the bulkhead, which are arranged to engage the supplied part carriers from the side for centering.

Guide tracks can be provided in the region of the first stack location, which are preferably provided with adjustment elements for receiving the workpiece carriers from the roller carts in a defined end position. The guide tracks can be formed as supports upon which rollers are arranged.

With this feature, it can be ensured that stacks of part carriers which are not uniformly stacked, as can be the case for example with parts coming from a hardening plant, are properly centered when driven into the first stack position and are aligned with the bulkhead wall. This results in a defined end position. Thus an optimal positioning of the part carriers at the first stack position results on the whole, which leads to high accuracy in the subsequent handling and avoids errors in handling.

In an advantageous embodiment of the present invention, the hood is configured to be U-shaped with a cover surface and two side surfaces. This results in a simple construction, where suitable drive and guide means can be arranged for the hood at the lower region of the side surfaces. Preferably, the hood is arranged to be driveable between the first, second and third stack position. This results in greater flexibility in handling the parts or part carriers within the working space.

The hood can be driven by means of the transfer device. Alternatively, the hood can have its own driving device, which allows a positioning above the first, second or third stack position. In this manner, dead times are avoided which could arise when the hood is driven by the transfer device. Short cycle times are also realizable, which are determined by the external processing stations.

When even shorter cycle times are required, the hood itself can be configured to have at least one part carrier on its upper side. In this manner, the hood can be driven to the third stack position while the transfer device transfers part carriers between the first and second stack position.

A drawer for receiving a part carrier can also be provided on the upper side of the hood, which allows the part carrier to be driven to the outside when the operating door is opened. This enables the supply and discharge of test parts and also allows an operation of the cell with only one part carrier independent of the part carriers stored therein. For example a short series production run can be interposed in the working flow.

A shaft rotatable about its axis can be provided to lock the hood in the three positions above the first, the second or the third stack position. The shaft can be provided with locking pins which are lockable with pin recesses on the hood in predetermined positions. A simple configuration for locking the hood results.

The horizontal linear axis of the transfer device is preferably formed on a U-shaped frame, on which horizontal guides are provided at the two elongate sides, between which a gripping device for handling a part carrier is mounted to be driveable in the direction of the shanks, where the horizontal guides are each mounted on a vertical guide driveable in vertical direction. A particularly simple and stable construction of the transfer device results, where it is also possible to integrate the drive and guides of the vertical axis into a vertical support of the automated cell, which is a portion of the stable frame on which the cell is mounted.

This stable frame, which can consist of a central floor portion, a front vertical frame portion in the region of the door and a back frame portion, allows a compact construction and at the same time, the upper ends of the front and back frame portions can serve as support surfaces for the portals lying thereon.

In an advantageous embodiment of the present invention, the first stack position of the automated cell is closed to the outside by at least one operating door to be secure against contact, through which the part carriers are supplied and removed from the automated cell. A mechanical lock is formed between the at least one operating door and the hood, which only allows the at least one door to be opened when the hood is located above the first stack position. The electrical security system with limit switches, which is otherwise necessary for the operating door can be relinquished, which leads to a distinct savings in cost. In addition, the operation reliability is increased because the limit switches which can be subject to defect are no longer necessary.

In a further embodiment of the present invention, a service door is provided at the end surface of the automated cell in the region of the first stack position, which is pivotally mounted at the side of at least one vertical side of the front frame portion. At least one operating door is provided on the service door.

In this manner, the entire automated cell is accessible from the outside when the service door is open, so that service work can be easily carried out. The service door is pivotally mounted on either the right vertical side of the front frame or on the left vertical side or on both vertical sides. It is mechanically locked so that the service door can only be opened with a tool, e.g. an Allen key. An additional electric locking system with limit switches is not required.

With the method according to the present invention, a stack-specific logistics can be realized in simple manner, by which all of the parts of a stack of part carriers are placed back into the same stack again after processing.

In an advantageous embodiment of this method, only a portion of the fresh parts are removed from one part carrier and exchanged with finished parts from the associated station during at least one restacking procedure of the stack of part carriers from one stack position to another stack position. In addition, the remaining fresh parts in part carriers are exchanged with finished parts from the associated station during at least one restacking procedure to fill up the respective part carrier with finished parts.

With these features, delays caused by restacking the part carriers can be avoided, or not all parts of a part carrier are used in sequence and transferred to the associated processing station. Rather, at least one part is saved, so that one fresh part remains on each part carrier which can be used when later restacking and exchanged with a finished part.

The automated cell can be advantageously operated according to the present method, such that practically no delays result in the supply to the associated processing or assembling stations, despite having only a single transfer device with two linear axes.

A further advantage is that a so-called refreshing of the parts in the automated cell ("refreshing a buffer") can be carried out without great effort, i.e. an exchange of the parts remaining in the automated cell over a longer time with new parts. An operation according to the FIFO principle (first in/first out) is also possible.

It will be understood that the above described features and those to be discussed below are applicable not only in the given combinations, but may be used in other combinations or taken alone without departing from the scope of the invention.

BRIEF DESCRIPTION OF THE DRAWINGS

Further features and advantages of the invention will become apparent from the following description of preferred embodiments taken in conjunction with the drawings.

FIG. 1 shows an interlinked production system in which the automated cell according to the invention can be used.

FIG. 2 shows a schematic illustration of an conventional automated cell.

FIG. 3 shows a schematic illustration of an automated cell according to the present invention, which preferably is employed in the production system of FIG. 1.

FIG. 5 shows a schematic side view of the automated cell of FIG. 4.

FIG. 6 shows a simplified illustration of the bulkhead of the automated cell of FIG. 3 in side view together with a side guide element for an associated roller cart.

FIG. 7 shows a plan view of the bulkhead of FIG. 6 with associated side guide elements.

FIG. 8 shows a simplified illustration of the bulkhead of FIG. 6 with associated roller cart and associated hood from the front.

FIG. 9 shows a simplified partial view of the hood from the side.

DETAILED DESCRIPTION OF THE PREFERRED EMBODIMENTS

Figure 4:
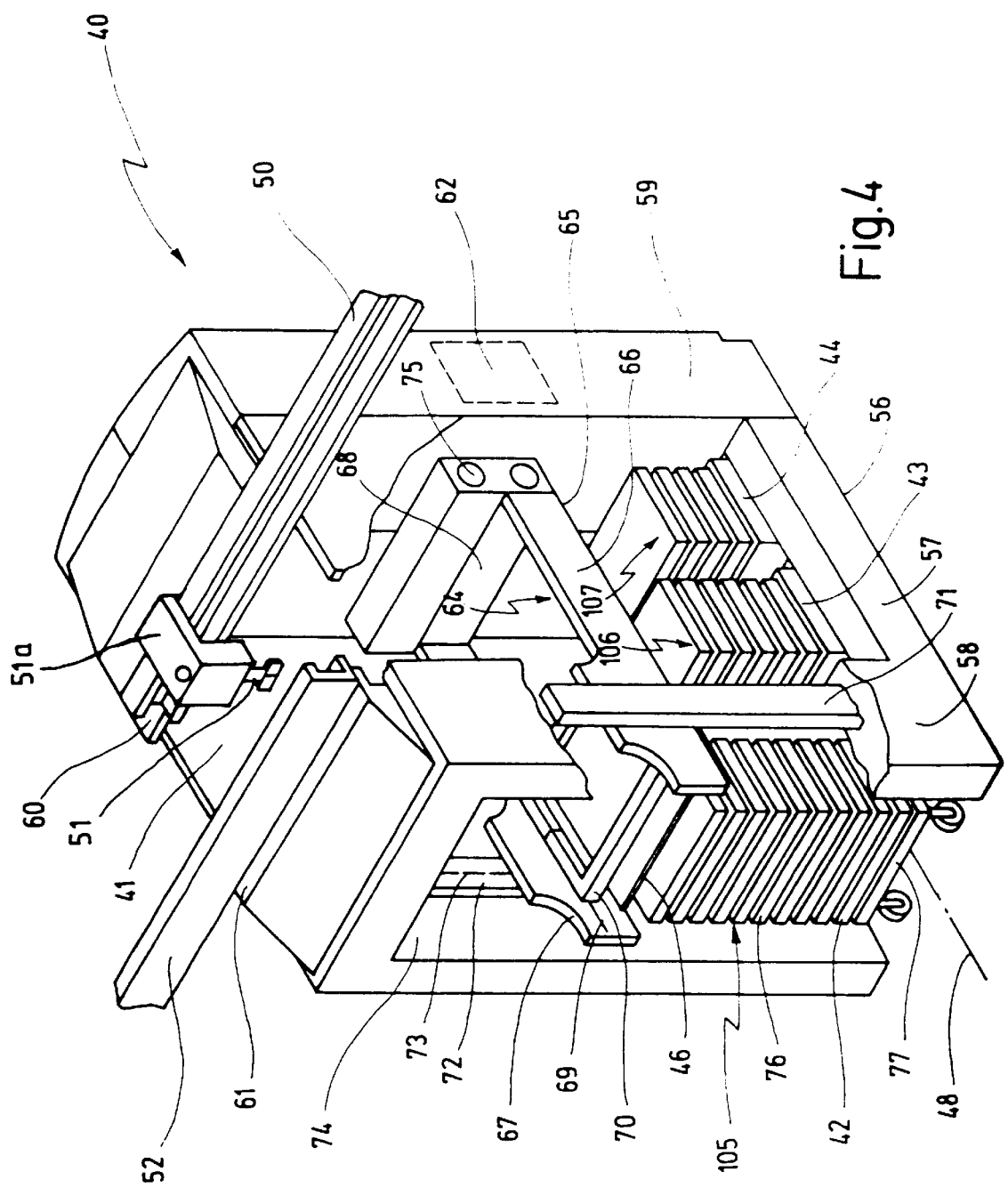
FIG. 4 shows a partially cut-away perspective view of the automated cell of FIG. 3, where a number of parts, for example the front door, has been left out for the purposes of better illustration.

An interlinked production system is shown schematically in FIG. 1 and designated with the numeral 10.

The production system 10 comprises a total of six processing stations 12, 13, 14, 15, 16, 17 as well as four associated buffers 23, 24, 25, 26 and five associated portals 18, 19, 20, 21, 22.

The illustrated system 10 is only a section of a larger production system 10 having a larger number of processing stations and associated buffers. For example, there could be 10 to 30 processing stations with a correspondingly adapted number of buffers.

According to FIG. 1, a first buffer 23 communicates with a first processing station 12 via a portal 18 and with two adjacent processing stations 13, 14 via the portal 13 and with a further buffer 24. The buffer 24 is coupled additionally to the processing station 15 via the portal 20 and with a further buffer 25. The buffer 25 communicates with two adjacent processing stations 16, 17 via the portal 21 and with the buffer 26. The buffer 26 is in turn connected to the subsequent stations of the production system 10 via a further portal 22.

Parts pass through the production system 10 in the flow direction 11, where these parts are subjected to sequential, different processing steps in the individual processing stations 12 to 17. The individual stations, for example the stations 13 and 14 as well as 16 and 17 can perform the same processing steps to allow a parallel processing of workpieces and thus an increased throughput at a slower station or to ensure an improved reliability against failure of a station.

In the production system illustrated in FIG. 1, the flow of parts through the system 10 takes place through the two portals 18, 19 or 19, 20 or 20, 21 or 21, 22, which each have a buffer 23, 24, 25 or 26 associated therewith. In this manner, parts from a previous processing station 12 can be transferred into the buffer 23 and parts out of the buffer 23 transferred to a subsequent processing station 13, 14, without the gripping devices or the like within the buffer 23 being hindered.

Basically however, it is also possible to use only a single portal to interconnect all of the processing stations and buffers.

At least one portal gripper is arranged on each portal 18 to 22 on a carriage drivable in longitudinal direction of the portal, as indicated by the arrow 27, and controllably driven in vertical direction. This allows parts to be removed from the buffers 23 to 26, to be placed in the buffers and to transfer the parts to processing stations 12 to 17 or to return same. In addition, stacks of part carriers can be supplied and discharged to the buffers 23, 24, 25, 26 from the side, as is indicated by the arrow 28.

All of the components of the interlinked production system 10 are decentrally controlled and therefore autonomous. However, the components for communicating information are coupled to a central system control and information system 29 (main control), which can take place through a bus system 30.

The buffers 23 to 26 are configured as automated cells 40 as shown in FIG. 3. The construction of a conventional automated cell according to EP 0 865 869 A1 is shown in FIG. 2 for comparison purposes and briefly described here.

The automated cell 32 in FIG. 2 comprises a closed working space 33 within which a stack position 35 and a further stack position 36 are arranged, between which a ready position 37 is provided. A stack exchange module 38 is additionally provided for supplying and discharging stacks of part carriers to the working space 33, the module having a loading space closed by doors to avoid contact to the outside. A bulkhead 39 is provided which is commonly rotated with a rotary frame upon which the stack position 35 and an opposite stack position 34 is arranged, and which is accessible from the outside through the doors. This arrangement allows the outer stack on the stack position 34 to be loaded or unloaded when the doors are open, while part carriers on the opposite stack position 35 within the working space 33 can be handled.

A one-arm pallet transfer device (not shown) is provided as transfer means within the working space 33, with which the part carriers can be stacked and unstacked between the stack positions 35, 36 and placed on top of the ready position 37. Here, the associated portal can remove parts from the part carrier with a portal gripper (not shown) or can place parts in this carrier. Alternatively to the one-arm pallet transferring device, a transferring device with a horizontal axis can also be provided, which is received to be driven on a vertical axis.

The known automated cell 32 requires a pallet transfer device within the working space 33 and in addition a stack exchange module 38. The automated cell 32 is relatively expensive in manufacture and has a comparatively large space requirement due to the rotatable stack exchange module 38, the necessary three stack positions and the ready position 37 between the two stack positions 35, 36.

In contrast, the automated cell 40 of the present invention has a low space requirement with a very narrow construction and can be manufactured less expensively.

The automated cell 40 of FIG. 3 comprises three stack positions 42, 43, 44 arranged sequentially in a horizontal direction 48. The first stack position 42 is closed to the outside by an operating door 47 having two pivotal wings and is separated from the second stack position 43 by a stationary bulkhead 45. When opening the operating door 47, a closure free of contact with the remaining portion of the automated cell 40 is ensured by a hood 46, so that part carriers can be moved back and forth within the working space 41 between the two stack positions 43, 44, without the danger of an accident when the operating door 47 is opened.

Two portals 50, 52 run above the automated cell 40, which are supported at the top of the automated cell 40. Portal grippers 51, 53 on the portals are drivable in the direction of the portals 50, 52 as indicated by the arrows 54, 55. Each of the grippers comprises a gripping device drivable in vertical direction for gripping parts.

A transfer device is provided with a linear axis drivable in horizontal direction and a linear axis drivable in vertical direction to transfer part carriers between the stack positions 42, 43, 44 within the working space 41 and for making the part carriers available for the grippers 51, 53, which is described in more detail below in conjunction with FIG. 4.

The automated cell 40 according to the present invention in FIG. 4 comprises a stable U-shaped frame 56 with a central element 57, a front frame portion 58 to which the two wing doors are mounted and a back frame portion 59.

The frame 56 and the front and back frame portions 58, 59 are configured to be twist resistant, such that the automated cell 40 on the whole with the associated components secured to the frame 66 can be transported and assembled. Support surfaces 60, 61 are provided at the upper ends of the front frame portion 58 and the back frame portion 59, upon which the portals 50, 52 can be secured, which leads to a simplification of the total configuration.

Furthermore, a controller 62 is integrated into the back frame portion 59, by which the function of the automated cell 40 is program controlled. A transfer device indicated by the numeral 64 is provided within the working space 41, which allows transfer of part carriers 76 between stacks 105, 106, 107 of workpiece carriers placed at the stack positions 42, 43, 44. In addition, parts can be removed or deposited into a top part carrier 76 by means of carriages drivable along the portals 50, 52 and carrying grippers (only one carriage 51a shown in FIG. 4 with vertically displaceable gripper 51).

The transfer device 64 comprises a U-shaped frame 65 having a central portion 68 ending shortly before the back frame portion 59 and two horizontally disposed shanks 66, 67. At their front region, the two shanks 66, 67 are received to be drivable in vertical direction along a vertical guide 73 in two vertical supports 71, 72 integrated into the front frame portion 58. For this purpose, a suitable drive 74 with a chain or toothed belt is integrated into the front frame member 58. Horizontal guides 69 are provided on the two shanks 66, 67, on which a gripping device 70 is driven under control. For this purpose a motor 75 is mounted on the centre portion 68 of the frame 65 and is coupled with a suitable chain or toothed belt.

The stack 105 of part carriers can be moved into or out of the first stack position 42 when the door is open, the stack being received on a roller cart 77 or a base frame.

As schematically illustrated in FIG. 5, a rapid work flow is ensured by an advantageous handling of the part carriers 76 by the single transfer device 64, by which the part carriers 76 can be transported between the stack positions 42, 43, 44 in horizontal direction 78. The work flow can be adapted to very short cycle times of the associated processing stations without causing delays. Simultaneously, a stack-specific logistics is ensured practically without delays.

When first starting up operation, a stack of part carriers with fresh parts is driven into the first stack position 42. When the door 47 is open, the first stack position 42 is separated with respect to the second stack position 43 by the stationary bulkhead 45 and also by the U-shaped hood 46 located above the first stack position 42 when the door is open. Thus the first stack position is securely guarded against contact with the remaining portion of the automated cell 40.

After closing the operating door 47, the hood 46 is driven away from the first stack position 42, so that the part carriers 76 can now be transferred with the gripping device 70 from the first stacking position 42, for example to the second stack position 43, as indicated by the arrow 85. In this operation, several part carriers 76 can be moved at the same time. After restacking to the second stack position 43, the individual part carriers 76 can be transferred in series to the third stack position 44. By means of the gripper indicated by the numeral 51, drivable in the vertical direction, parts 82, 83 can be removed from or placed into the part carriers 76 with a double gripper 81 provided on the gripper.

Delays caused by restacking can be avoided in that not all parts of a part carrier are removed sequentially and transferred to the associated processing station, but at least one part is left and each part carrier 76 retains one fresh part.

When later restacking the part carriers from the third stack position 44 to the first stack position 42, the remaining fresh parts can then be used and exchanged by the double gripper 81 with finished parts from the processing station. The double gripper 81 is pivotally mounted on the gripper 51 as indicated by the arrow 84. The U-shaped frame 65 of the transfer device 64 as explained above, can be driven in vertical direction on the vertical supports 71, 72 as illustrated with the double arrow 86 in FIG. 5. The gripper 70 for grasping the part carriers 76 can be driven in horizontal direction on the U-shaped frame 65 as indicated by the double arrow 79.

The hood 46, which serves as a protection against contact, can be driven on a horizontal guide 96 between the stack locations 42, 43, 44. For this purpose, the transfer device can be used 64 for moving the hood 46 among these three positions. When the associated processing stations have very short cycle times, the hood 46 however can also be equipped with its own drive. For particularly short cycle times, the upper side of the hood 46 itself can be configured to receive a part carrier, as is indicated by numeral 76', when the hood is located at the position 46' over the third stack position 44.

This enables a decoupling of the transfer between the stack positions 42 and 43 from the supply or removal of parts from the uppermost part carrier at the third stack position 44.

In addition, a telescopic drawer 120 can be provided on the top side of the hood 46 for receiving a part carrier 76', which allows the part carrier 76' to be driven outwardly in the arrow direction 122 when the operating door 47 is open (FIG. 9). This allows the supply and discharge of test parts (SPC parts) and allows operation of the automated cell 40 independently of the stacks of part carriers located therein, for example for a small production series.

The bulkhead 45, shown in enlarged illustration in FIGS. 6 and 7, is preferably configured to be particularly stable, and as seen in the plan view in FIG. 7, is provided with centering surfaces 87, 88 at its outer ends. The stacks of part carriers, driven into the first stack position 42 on a roller cart 77, is centered by the two inclined centering surfaces 87, 88 and is aligned to the flat surface of the bulkhead 45.

In addition, guide elements 89, 90 are provided in the front region at both sides near the door, which can be movable as indicated by the arrows 91, 92 to allow a pre-centering of a stack of part carriers before introduction into the first stack position 42. This is appropriate for example for carriers with parts coming from a hardening plant.

A guide track, as indicated by the numeral 108 can also be arranged at both sides for receiving a stack of part carriers when introduced to the first stack position 42. The track is adjustable for alignment with respect to the floor surface by means of an adjustment element 102. Rollers 101 are provided on these two guide tracks 108 to receive the roller carts independent of the floor surface thereunder. A stack of part carriers can then be pushed onto the forward lower rollers of the guide tracks 108 and then with a thrusting movement be transferred onto the two guide tracks 108. The stacks of part carriers are then properly aligned by the centering surfaces 87, 88 on the bulkhead 45 independent of the floor surface and received at the first stack position 42. Thus a high accuracy in positioning for the later handling procedures is achieved.

In the enlarged illustration of FIG. 8, one recognises that the hood 46 is configured with an upper cover surface 93 and two side surfaces 94, 95, which can be driven along the horizontal guides 96 at their lower ends by means of a drive device 97.

To secure the hood 46 over the first stack position 42, the second stack position 43 or the third stack position 44, a shaft 98 can be provided at the side of the hood 46 as shown in FIG. 8. The shaft is rotatable about its longitudinal axis and has three locking pins 99 at suitable locations, which can be locked with recesses 100 on the hood 46 when the desired locking position has been reached.

In addition, the entire automated cell can be configured to be drip-proof so that the entrainment of cooling lubricant can be avoided. For this purpose, the entire region of the working space 41 is lined with a floor pan 109. At the same time, the loss of cooling lubricant in the region of the first stack position 42 can be avoided in that the floor pan 109 is extended beneath the guide 96 for the hood 46 as shown in FIG. 8. The configuration is such that a drop collecting surface 103 projects to extend over the edge 104 of the roller cart 77, so that the intermediate space toward the roller cart 77 is covered. Consequently, the cooling lubricant dropping off of the parts or part carriers is collected either on the roller cart 77 or in the floor pan 109.

Figure 10:
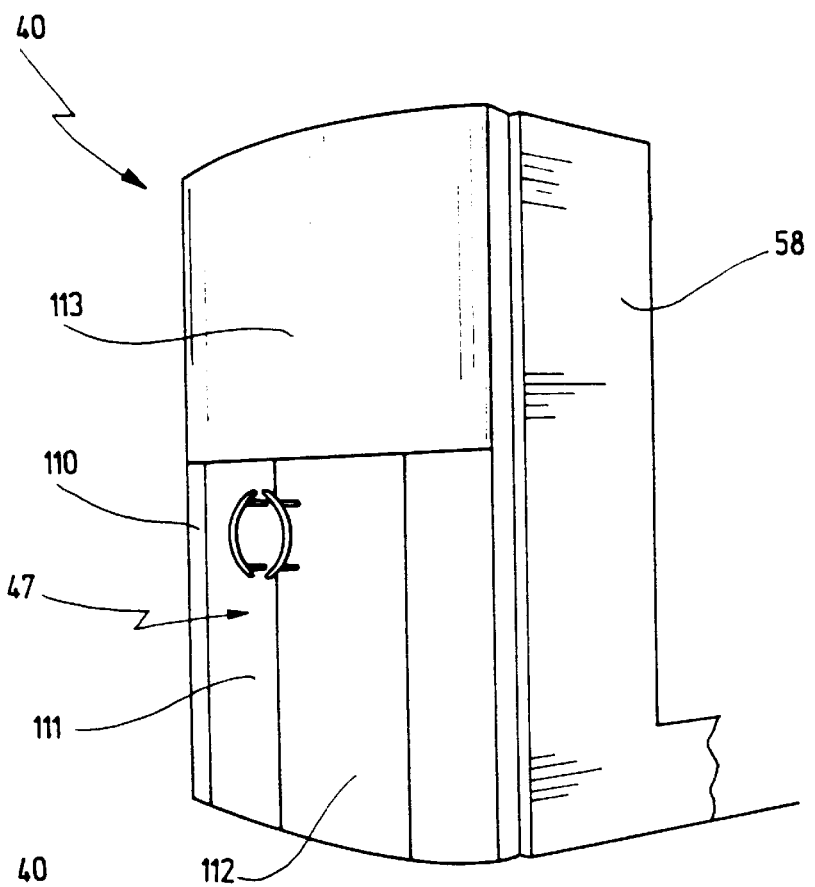
FIG. 10 shows a perspective partial view of the automated cell of FIG. 3 from the front with an additionally attached service door on the end surface.
Figure 11:
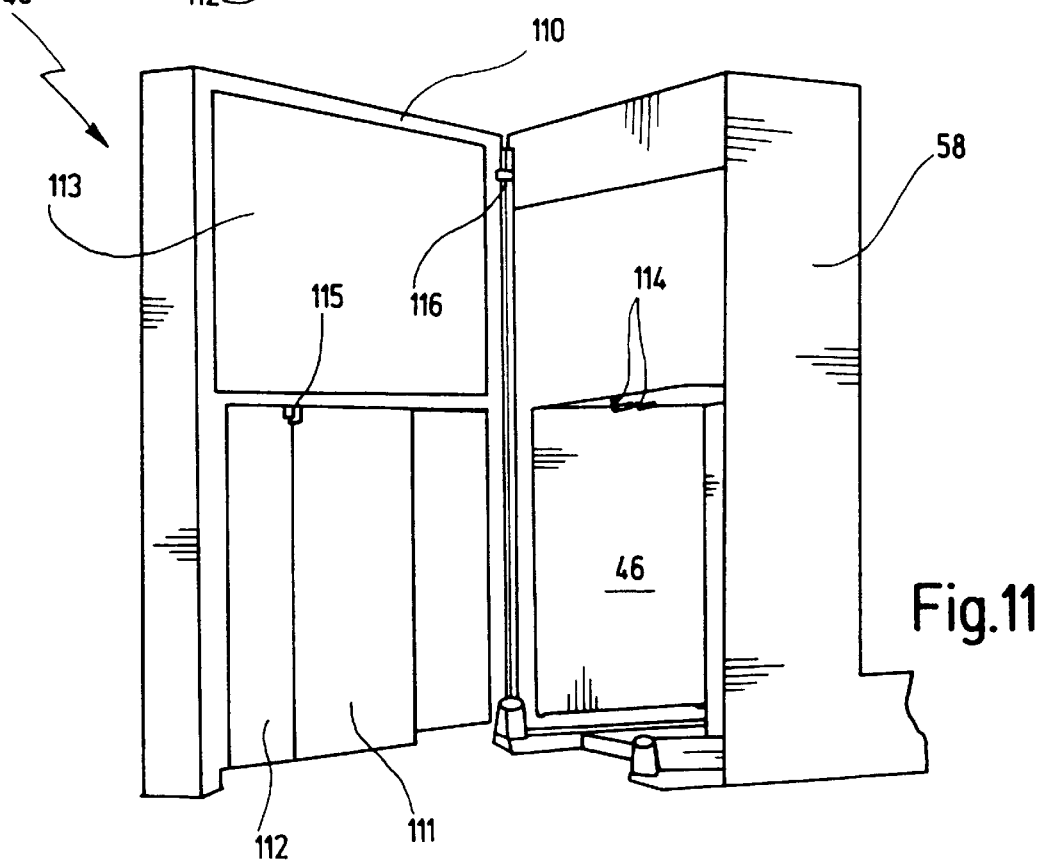
FIG. 11 shows a simplified illustration of the automated cell of FIG. 10 when the service door is opened.

In addition to the automated cell 40 shown in FIG. 3, the front end surface of the automated cell 40 is shown in FIGS. 10 and 11 in the region of the first stack position. Loading into the first stack position 42 is only possible when the operating door 47 is opened. The operating door 47 includes two wing doors 111, 112 pivotal to the outside. The inspection window 113 above the doors 111, 112 allows a view into the cell during operation.

The inspection window 113 and the two wing doors 111, 112 are secured to a service door 110, as shown in detail in FIG. 11, which can be pivoted outwardly as a whole and thus exposes the entire end surface of the automated cell 40 in the area of the first stack position 42. The service door 110 is pivotally mounted both at the left side of the front frame portion 58 and the right side of the front frame portion 58. Only one hinge 116 is illustrated in FIG. 11 as an example on the left side, where the service door 110 is illustrated in the position of having been swung open about the left hinge.

Alternatively, the service door 110 can be closed and locked with its hinge on the right side, while the connection to the left side is open, so that the service door can be swung open about its right edge. The opening and closing of the locking means at the right or left side takes place with a suitable tool, for example an Allen key.

FIG. 11 also schematically illustrates a mechanical locking between the hood 46 and the two doors 111, 112. Two locking elements 114 are indicated at the upper region of the hood 46, which can be locked with correspondingly configured locking elements on the inside of the doors 111, 112. Opening the two swinging doors 111, 112 is then only possible when the hood 46 is located in the position indicated in FIG. 10 above the first stack position 42. In this manner, a guard against contact is ensured without requiring an electric safety system with a final limit switch, which represents a considerable cost savings compared to the complicated final limit switches.

What is claimed is:

1. An automated cell for handling parts received on a part carrier, said automated cell comprising:

a working space enclosed by a wall;

an operating door located in a front part of said wall;

a first stack position located within said working space adjacent said operating door;

a second stack position located within said working space adjacent said first stack position;

a third stack position arranged within said working space adjacent said second stack position, said first, second and third stack positions being sequentially arranged adjacent each other in a first horizontal direction;

a transfer device located within said working space, said transfer device having a vertical linear axis extending vertically, along which a horizontal linear axis extending in said first horizontal direction is displaceable, a carriage moveable along said horizontal linear axis, said carriage comprising a first gripper for gripping part carriers and moving said part carriers along said horizontal linear axis between said first, second and third stack positions and vertically along said vertical linear axis;

at least one portal extending horizontally above said working space and comprising a carriage movable along said portal, said carriage comprising a second gripper for gripping parts located on one of said part carriers underneath said carriage;

a bulkhead extending substantially vertically between said first and second stack positions;

wherein said first gripper is configured for moving part carriers between said first and second stack positions by raising same above said bulkhead, and wherein said operating door is configured for loading part carriers there through in said first horizontal direction into said first stack position and out of said first stack position.

2. The automated cell of claim 1, wherein the bulkhead is configured to be stationary.

3. The automated cell of claim 2, wherein the bulkhead comprises centering surfaces for guiding and centering part carriers loaded into said first stack position.

4. The automated cell of claim 2, further comprising guide elements cooperating with said bulkhead for engaging part carriers loaded into said first stack position against said bulkhead and for centering same.

5. The automated cell of claim 1, further comprising a hood, which is horizontally displaceable between said first and second stack positions, for separating said first stack position together with said bulkhead from the remainder of said working space when being on said first stack position, thereby allowing loading and unloading of stacks through said operating door into and from said first stack position while handling parts within the remainder of said working space.

6. The automated cell of claim 5, wherein said hood is configured to be U-shaped and comprises a cover surface and two side surfaces.

7. The automated cell of claim 5, wherein said hood is displaceable between said first, second and third stack positions.

8. The automated cell of claim 7, wherein the transfer device is configured for driving said hood between said stack positions.

9. The automated cell of claim 7, further comprising a drive means coupled to said hood for positioning same above said first, second or third stack position.

10. The automated cell of claim 5, wherein said hood comprises a top configured to receive at least one part carrier thereupon.

11. The automated cell of claim 10, wherein said hood further comprises a drawer arranged on top thereof, said drawer configured for receiving a part carrier and being extendable when said operating door is open.

12. The automated cell of claim 5, further comprising a shaft rotatable about its axis and comprising a locking means engagable with a locking means provided on said hood for locking said hood in predetermined positions.

13. The automated cell of claim 5, further comprising a locking means engaging said operating door and said hood, said locking means preventing to open said operating door when said hood is not located above the first stack position.

14. The automated cell of claim 1, further comprising guide tracks extending from said bulkhead toward said operating door for guiding workpiece carriers received from a roller cart into a defined end position.

15. The automated cell of claim 1, wherein the horizontal linear axis of the transfer device comprises two parallel horizontal guides spaced from one another and extending in horizontal direction, said gripping device being guided along said horizontal guides and being coupled to a drive means.

16. The automated cell of claim 1, wherein said first gripper is configured for moving part carriers between said first and second stack positions by gripping said part carriers, raising said gripped part carriers from one of said stack positions, moving said gripped part carriers horizontally to a position over a second one of said stack positions, lowering said gripped part carriers onto said second one of said stack positions, and releasing said gripped part carriers.

17. The automated cell of claim 1, wherein:

said carriage comprises a frame disposed over said stack positions, said frame being driveable in the vertical direction; and said first gripper is mounted within said frame, and is driveable in the horizontal direction.

18. A method of handling parts in an handling device comprising a working space enclosed by a wall, an operating door located within a front part thereof, a first stack position located within said working space adjacent said operating door, a second stack position located within said working space adjacent said first stack position and a third stack position located adjacent said second stack position, said first and second stack positions being separated by a bulkhead extending substantially vertically there between, said method comprising the steps of:

loading a plurality of part carriers containing fresh parts through said operating door onto said first stack position;

locking said operating door;

stacking part carriers between said first, second and third stack positions while raising said part carriers above said bulkhead when passing said bulkhead;

removing fresh parts from one of the part carriers when being above one of said second and third stack positions and transferring said parts on a carriage along a portal extending above said working space out of said working space toward a processing site;

receiving processed parts from said processing site on said carriage and transferring said carriage along said portal to a location above one of said second and third stack positions;

placing said processed parts onto one of said part carriers;

repeating said removing and transferring steps of said fresh and said processed parts;

restacking part carriers containing processed parts from one of said second or third stack positions back toward said first stack position;

opening said operating door; and unloading said part carriers from said first stack position.

19. The method of claim 18, wherein only a portion of the fresh parts are removed from a part carrier and exchanged with processed parts during at least one restacking procedure of a stack of part carriers from one stack position to another stack position.

20. The method of claim 19, wherein during at least one restacking procedure, fresh parts still present in a part carrier are exchanged with processed parts to fill up the respective part carriers with processed parts.

* * * * *